United States Patent [19]

Biskup

[11] Patent Number: 5,763,784
[45] Date of Patent: Jun. 9, 1998

[54] DIFFERENTIAL PRESSURE TRANSDUCER UNIT WITH AN OVERLOAD PROTECTION SYSTEM

[75] Inventor: Jürgen Biskup, Minden, Germany

[73] Assignee: Hartmann & Braun GmbH & Co. KG, Frankfurt, Germany

[21] Appl. No.: 795,148

[22] Filed: Feb. 7, 1997

[51] Int. Cl.⁶ .............................. G01L 13/02; G01L 15/00; G01L 7/00
[52] U.S. Cl. .............................. 73/716; 73/706
[58] Field of Search .............................. 73/706, 709, 715, 73/716, 717, 718, 719, 720, 721, 722, 723, 724, 725, 726, 727, 756; 338/4, 42

[56] References Cited

U.S. PATENT DOCUMENTS

| | | | |
|---|---|---|---|
| 3,691,842 | 9/1972 | Akeley | 73/718 |
| 4,080,830 | 3/1978 | Eckstein et al. | 73/719 |
| 4,364,276 | 12/1982 | Shimazoe et al. | 73/721 |
| 4,612,812 | 9/1986 | Broden | 73/718 |
| 5,319,981 | 6/1994 | Mei et al. | 73/706 |
| 5,483,834 | 1/1996 | Frick | 73/724 |

*Primary Examiner*—William L. Oen
*Attorney, Agent, or Firm*—Michael M. Rickin

[57] ABSTRACT

A differential pressure transducer unit with an overload protection system to measure slight differential pressure in liquids and gases under high static compression loading, which unit can be connected by flanges to the differential-pressure lines. To avoid disturbing influences on the measuring element caused by radial tensions of the means of the overload protection system dependent on the absolute pressure, the measuring element is fasten in a cutout of the measuring-element housing so that it can oscillate and is free from tension. Each insulation plate is fitted with an eccentrically located measuring duct through which pressure-measuring agent flows, and which is connected at least indirectly to the measuring element.

3 Claims, 1 Drawing Sheet

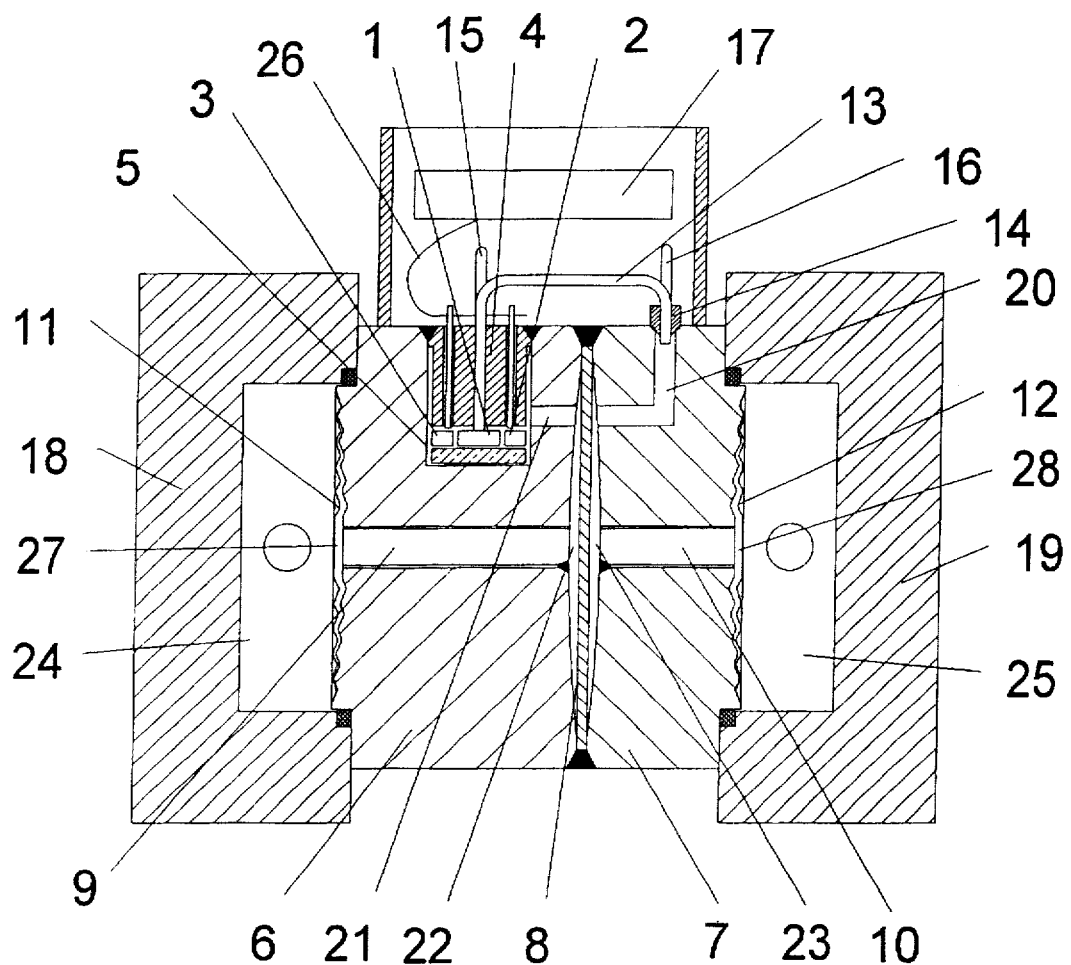
Fig.

DIFFERENTIAL PRESSURE TRANSDUCER UNIT WITH AN OVERLOAD PROTECTION SYSTEM

FIELD OF THE INVENTION

The invention relates to a differential pressure transducer unit with an overload protection system to measure slight differential pressure in liquids and gases under high static compression loading, which unit can be connected by flanges to the differential-pressure lines.

DESCRIPTION OF THE INVENTION

Devices of this type are known through prior use and from pertinent publications. Their underlying mechanical construction is described in detail in GB 2 065 893 and EP 0 143 702. Irrespective of the type of conversion of mechanical pressure/differential-pressure signals into equivalent electrical variables, in accordance with both prior publications, an essentially cylindrical central body is provided, which is enclosed between two identical shell-shaped caps using appropriate sealants. These caps are screwed together by a plurality of bolts which are arranged radially and are mechanically prestressed, the mechanical prestressing of the bolts being selected so as to avoid any pressure loss on the central body under maximum permissible static compression loading.

As a result of this mechanical prestressing, inherent in the principle, which varies according to the individual device, mechanical prestressing of the central body occurs. This mechanical prestressing brings about an offset or a deformation of the characteristic, dependent on the prestressing, of the measuring or overload diaphragm extending over a center-plane of the central body. Furthermore, the required seals have to be adapted to the individual device in terms of their material composition dependent on the process medium, and moreover they are subject to wear.

On the side of the central body, each cap has a cutout which is joined to flange connections via channels which are usually designed as bores. The center spacing of these channels at the flange connections is specified in standards.

In an asymmetrical position, the central body has a neck on which a top part is fastened, in which means are provided for converting, processing and displaying measured values in accordance with GB 2 065 893.

The large number of pressure-tight joints required in the known pressure measuring devices necessitates to a considerable extent precision machining on a plurality of individual parts.

Furthermore, a pressure measuring device is known from WO 88/02107, which comprises a cylindrical basic body on which tangential flange connections are provided on one side, between which the pressure sensor is located. Although this device has a small number of pressure-tight joints, it is, however, fixed in its manner of assembly by having a set mechanical assignment of the display means to the device position.

A particular problem in measuring devices of this type is the overload protection system which is intended to protect the sensitive differential-pressure sensor from damage in the event of a pressure drop on one side, in which the static pressure is present as differential pressure. For this purpose, a measuring transducer is known from the Hartmann & Braun list sheet 10/15-6.21, October 1992 issue, in which the measuring capsule surrounding the measuring element is suspended centrally with axial movement on an overload diaphragm of rotationally symmetrical circumference.

In practice, however, it has been shown that an overload protection system of this type leads to measuring errors depending on the static pressure. In particular in the case of small differential pressures which are caused by mechanical tensions of the housing which increase with the static pressure and propagate via the overload diaphragm to the measuring element and which, furthermore, are widely scattered in terms of their tolerances as a result of thermal joining processes for each individual measuring element. Therefore, it is desirable to further develop the overload protection system of a differential pressure transducer unit of the type described above in such a way as to avoid disturbing influences on the measuring element caused by radial tensions of the means of the overload protection system dependent on the absolute pressure.

SUMMARY OF THE INVENTION

A transducer unit for measuring differential pressure in a process medium. The transducer unit includes a measuring element and a housing for the measuring element. The housing is made up essentially symmetrically of two insulation plates which are firmly connected to one another with interposition of an overload diaphragm and are surrounded by a pair of caps to form two chambers for supply of the process medium pressure. The sides of the insulation plates facing the overload diaphragm are of essentially concave design and form internal pressure-measuring agent chambers. The insulation plates have bores perpendicular to the plane of the overload diaphragm thereby forming a pressure-measuring agent duct in each case. Each pressure chamber is sealed by an axially movable insulation diaphragm against an associated one of the two insulation plates, and forms an external pressure-measuring agent chamber in each case. The internal pressure-measuring agent chamber belonging to an insulation plate is connected in each case via the pressure-measuring agent duct to the external pressure-measuring agent chamber and is filled with an essentially incompressible pressure-measuring agent.

The housing has a cutout wherein the measuring element is housed so that the measuring element can oscillate and is free from tension. Each of the insulation plates has an eccentrically located measuring duct through which pressure-measuring agent flows. The duct is connected at least indirectly to the measuring element.

DESCRIPTION OF THE DRAWING

The single drawing in a sectional illustration shows the main constituents of a differential pressure transducer unit embodied in accordance with the present invention.

DESCRIPTION THE PREFERRED EMBODIMENTS(s)

The differential pressure transducer unit comprises a central subassembly which is made up of two insulation plates 6 and 7 with an overload diaphragm 8 located between them. The unit is preferably welded to be pressure-tight. The surfaces of the insulation plates 6 and 7 facing the overload diaphragm 8 are essentially of concave shape and, with the overload diaphragm 8, surround internal pressure-measuring agent chambers 22 and 23 located on both sides of the overload diaphragm 8. The outside surfaces of the insulation plates facing away from the overload diaphragm 8 are essentially of concave shape and are each welded to an insulation diaphragm 11 and 12, in each case forming an external pressure-measuring agent chamber 27 and 28.

The insulation plates 6 and 7 each have a central pressure-measuring agent duct to connect the respectively associated internal pressure-measuring agent chamber 22 and 23 to the respectively associated external pressure-measuring agent chamber 27 and 28. Each volume unit formed from an internal pressure-measuring agent chamber 22 or 23 and the associated external pressure-measuring agent chamber 27 or 28 and the associated pressure-measuring agent duct is filled separately with an essentially incompressible pressure-measuring agent.

This central subassembly is mounted between caps 18 and 19, forming pressure chambers 24 and 25 to supply the process pressures.

Furthermore, a measuring element 1, 2, 3 comprising sensors for differential pressure 1, absolute pressure 3 and sensor temperature 2 is provided, which is connected via a connection cable 26 to means 17 for processing measured values. In this case, the means 17 for processing measured values may be supplemented by means for displaying measured 35 values. The measuring element 1, 2, 3 is mounted as a self-sufficient integral unit on an electrical bushing 4.

Provided for mechanical fastening is a cutout 5 in a measuring-element housing surrounding the measuring element 1, 2, 3, in which cutout the measuring element 1, 2, 3 is fastened so that it can oscillate and is free from tension. In this case, provision is made specifically for the measuring element 1, 2, 3 mounted on the electrical bushing 4 to be inserted into the cutout 5 without contact, the cutout 5 being closed by the electrical bushing 4 in the manner of a lid or plug.

Mechanical tensions of the measuring-element housing are advantageously absorbed by the electrical bushing 4, so that the measuring element 1, 2, 3 may be pivoted in the cutout 5, but in any case remains free from tension.

To supply the process pressures to the measuring element 1, 2, 3, an eccentrically-located measuring duct 20 and 21 is provided in each insulation plate 6 and 7, through which duct pressure-measuring agent flows. The measuring duct 20 and 21 is connected at least indirectly to the measuring element 1, 2, 3.

In a particular refinement of the invention, provision is made for the insulation plates 6 and 7 to be of asymmetrical design in terms of their axial extent, and for the thicker insulation plate 6 to have the cutout 5 for the measuring element 1, 2, 3. In this case, the measuring duct 21 in the insulation plate 6 is a direct connection of the associated internal pressure-measuring agent chamber 22 to the interior of the cutout 5, so that the measuring element 1, 2, 3 is flushed by the pressure-measuring agent in the cutout 5. A tube 13, which is passed through the bushing 4, is provided to connect the measuring element 1, 2, 3 to the measuring duct 20 in the insulation plate 7. In this case, the first side of the differential-pressure sensor 1 is loaded by the pressure-measuring agent surrounding the sensor with the process pressure from the pressure chamber 35 24 of the cap 18. The second side of the differential-pressure sensor 1 is connected by the tube 13 via a flange 14 welded to the insulation plate 7 and is loaded with the process pressure from the pressure chamber 25 of the cap 19.

The absolute-pressure sensor 3 is flushed completely by the pressure-measuring agent surrounding the insulation plate 6, and it measures the absolute pressure in the pressure chamber 24. The temperature sensor 2 measures the temperature in the direct vicinity of the absolute-pressure sensor 3 and the differential-pressure sensor 1. The measuring element is filled with a fluid acting as a pressure-measuring agent via filling connections 15, 16 assigned in each case to a pressure space.

As a further refinement of the invention, bolts 9 and 10 are inserted into the pressure-measuring agent ducts, forming an annular gap. The bolts 9 and 10 are welded to the insulation plates 6, 7 on the side facing the overload diaphragm 8. This annular gap between bore and bolts prevents flames from penetrating into the pressure chambers 24 and 25, filled with process gas and surrounded by the caps 18 and 19, in the event of an explosion in the interior of the measuring transducer.

The sensors 1, 2 and 3 are fastened on the bushing 4 and are not moved with the overload diaphragm 8. This obviates the need for movable electrical connections between the sensors 1, 2 and 3 and the means 17 for processing measured values. Moreover, only a single pressure-tight electrical bushing 4 is required. As a result, the electrical connections in the interior of the measuring element 1, 2, 3 can be reduced to a minimum, and there are fewer sealing points.

The overload diaphragm 8 consists of a simple flat circle. Additional unsymmetrical stresses in the overload diaphragm 8 due to joining, shaping or welding processes are avoided. Furthermore, no forces are transmitted to the sensors 1, 2, 3 via the overload diaphragm 8, as is the case in measuring transducers in which the sensors 1, 2, 3 form an integral unit with the overload diaphragm 8, or in which the sensors 1, 2, 3 are welded onto the overload diaphragm with the aid of a bushing.

In the event of pressure surges, for example due to sudden pressure drop in the pressure chamber 25, the pressure of the process gas in the pressure chamber 24 causes a curvature of the insulation diaphragm 11 in the direction of the opposite pressure chamber 25 until its surface on the insulation-plate side rests on the surface of the insulation plate 6. In this case, the volume of the associated external pressure-measuring agent chamber 27 is reduced to about zero. The pressure-measuring agent contained in the external pressure-measuring agent chamber 27 flows through the flame barrier, which is formed by the remaining annular gap between the pressure-measuring agent duct and the bolt 9 arranged therein, into the associated internal pressure-measuring agent chamber 22. As a result of the pressure-measuring agent flow, the overload diaphragm 8 is deflected in the direction of the insulation plate 7.

In effect, the pressure is conducted from the insulation diaphragm 11 via the flame barrier acting as a damping member to the overload diaphragm 8 and then through a separate measuring duct 21 to the sensors 1, 2, 3, the internal pressure-measuring agent chamber 22 acting as a buffer store. This means that pressure surges first act on the overload diaphragm 8 and only afterwards via measuring ducts 20, 21 on the sensitive differential-pressure sensor 1.

The absolute-pressure sensor 3 records the static pressure of the process medium. The pressure-dependent errors of the differential-pressure sensor 1 are compensated by the signal for the static pressure. The temperature-dependent errors of the differential-pressure sensor 1 are compensated by the signal of the temperature sensor 2. The compensation is calculated by a processor contained in the means 17 for processing measured values. Any errors in the signal of the static pressure are likewise corrected, and the signal is output, if required, via signal lines (not illustrated).

The unit comprising the bushing 4 with the sensors 1, 2 and 3 can easily be tested prior to final assembly. Furthermore, the recording of the temperature in the vicinity of the sensors 1 and 2 is advantageous for avoiding dynamic temperature errors.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A transducer unit for measuring differential pressure in a process medium comprising:

a) a measuring element; and
   b) a housing for said measuring element made up essentially symmetrically of two insulation plates which are firmly connected to one another with interposition of an overload diaphragm are surrounded by a pair of caps to form two chambers for supply of said process medium pressure, the sides of said insulation plates facing said overload diaphragm being of essentially concave design, forming internal pressure-measuring agent chambers, said insulation plates having bores perpendicular to the plane of said overload diaphragm, forming a pressure-measuring agent duct in each case, each pressure chamber being sealed by an axially movable insulation diaphragm against an associated one of said two insulation plates, and forming an external pressure-measuring agent chamber in each case, said internal pressure-measuring agent chamber belonging to an insulation plate being connected in each case via said pressure-measuring agent duct to said external pressure-measuring agent chamber and being filled with an essentially incompressible pressure-measuring agent, said housing having a cutout wherein said measuring element is housed so that said measuring element can oscillate and is free from tension; and each of said insulation plates having an eccentrically located measuring duct through which pressure measuring agent flows, and which is connected at least indirectly to said measuring element.

2. The differential pressure transducer unit of claim 1, wherein each of said insulation plates are constructed to be asymmetrical in their axial extent, one of said insulation plates is thicker than the other of said insulation plates and said cutout is located in said thicker insulation plate, and said measuring element is connected to said internal pressure-measuring agent chamber belonging to said thicker insulation plate directly via said pressure measuring agent duct associated with said thicker insulation plate and to said pressure measuring agent duct measuring duct associated with said other insulation plate via a tube located in said housing.

3. The differential pressure transducer unit of claim 1, wherein each of said pressure-measuring agent ducts is provided with a bolt which is connected at least on one side to said associated insulation plate, forming an annular gap.

* * * * *